United States Patent [19]

Wildmoser

[11] Patent Number: 4,933,041
[45] Date of Patent: Jun. 12, 1990

[54] METHOD AND APPARATUS FOR SEALING PLASTIC TUBES

[75] Inventor: Martin M. Wildmoser, Florence, Ky.

[73] Assignee: R. A. Jones & Co. Inc., Covington, Ky.

[21] Appl. No.: 166,114

[22] Filed: Mar. 10, 1988

[51] Int. Cl.⁵ ............... B32B 31/02; B32B 31/20; B32B 31/26
[52] U.S. Cl. .................. 156/198; 156/308.4; 156/309.9; 156/322; 156/443; 156/499
[58] Field of Search ............ 156/499, 497, 198, 287, 156/308.4, 309.9, 226, 227, 443, 458, 498, 322; 425/437; 53/477, 483

[56] References Cited

U.S. PATENT DOCUMENTS

| | | | |
|---|---|---|---|
| 2,715,087 | 8/1955 | Barradas | 156/198 |
| 3,475,786 | 11/1969 | Pearson | 425/437 |
| 3,555,652 | 1/1971 | Ignell | 425/437 |
| 3,765,144 | 10/1973 | Schlesser | 53/412 |
| 4,088,526 | 5/1978 | Amberg | 156/499 |
| 4,351,692 | 9/1982 | Ouellette | 156/443 |
| 4,511,426 | 4/1985 | Linner | 156/497 |
| 4,695,337 | 9/1987 | Christine | 156/499 |

Primary Examiner—Marion C. McCamish
Assistant Examiner—J. Davis
Attorney, Agent, or Firm—Wood, Herron & Evans

[57] ABSTRACT

Method and apparatus for sealing the end of a thermoplastic tube wherein a tapered mandrel is heated to a temperature above the melting point of the tube and is inserted into the tube to force direct contact of the tube with the mandrel. After the contacted surface has fused, the mandrel is raised and a heated jet of air expands the tube, allowing the mandrel to be withdrawn. Jaws clamp the mandrel surfaces together to form the seal.

2 Claims, 2 Drawing Sheets

METHOD AND APPARATUS FOR SEALING PLASTIC TUBES

This invention relates to a method and apparatus for sealing the end of a tube.

Small tubes, such as toothpaste tubes, are often made of a thermoplastic or of a laminate with an inner layer that includes plastic. The tubes have a cap and that is first closed. With the tube vertical, cap end down and upper end open, the tube is filled. Thereafter, the open end is sealed.

There have been several ways of sealing the open end of the tube. Radiant heat has been applied from the outside, and jaws have been employed to close the tube. Heated jaws have been applied to both heat and apply the required pressure to seal the tube. Both of these systems require heat from the outside to penetrate to the inside of the tube and raise its temperature sufficiently high to make a fused joint. Ultrasonic sealing is used. That is a very slow system permitting the sealing of no more than about 50 tubes per minute. High frequency sealing has been tried. That requires a laminate that includes a metal. The system is satisfactory but can only be used with laminates.

In one of the used systems, a jet of hot air is blown into the interior of the tube, thereby heating the inner surface of the tube until a surface layer melts. Thereafter, jaws squeeze the end of the tube to form the seal. See U.S. Pat. No. 4,511,426 as an example of that system. That system can seal about 80 to 90 tubes per minute and is therefore more satisfactory than the systems described earlier. It is, however, expensive in that a lot of heat is simply discharged into the atmosphere. It is noisy because of the need to blow large amounts the hot air against the surface of the tube.

Still another method has been disclosed in the patent literature but is not known to have been used commercially. In that system, a heated mandrel is introduced into the tube and makes direct contact with the surface of the tube. See, for example, U.S. Pat. Nos. 2,715,087 and 3,765,144. Those patents do not disclose how good contact is made. The '087 patent even refers to radiant heating, that is, heating without direct contact as a satisfactory alternate. It cannot be determined how the procedures would provide reliable seals, done quickly, while accommodating tubes of significantly differing diameters arising out of the production tolerances in making the tubes.

It has been an objective of the present invention to improve the heat sealing method and apparatus so that the method is at least as fast as the best known methods, is quieter, is more efficient, and has no adverse effect arising out of blowing heat onto the product in the tube.

The objective of the present invention has been attained by providing a mandrel mounted on a heated core that heats the mandrel to a temperature about 100° C. above the melting point of the plastic of the tube. The mandrel has a slight taper, about 5°. In practicing the method, the tubes having a tolerance of about ±0.010 inch are forced upon the tapered mandrel, thereby imparting a flare to the end of the tube and providing intimate contact between the mandrel and the interior surface of the tube, across a band about one-fourth inch wide. The mandrel is preferably coated with a high release material such as a Teflon-impregnated ceramic (the type currently used with non-stick frying pans), thereby minimizing the adhesion of the heated tube to the mandrel.

The mandrel has air ports and a system of providing an air pulse to the ports to help separate the tube from the mandrel after it is heated. The invention also contemplates the provision of a tortuous path by which the air is directed past the heated core so as to preheat the air to a temperature equal to the temperature of the mandrel, for example 200° C., thereby minimizing any cooling effect of the release air on the molten plastic.

The mandrel is also provided with a short lead-in taper of about 30° to minimize the aligning of the mandrel with the tube to be sealed.

The several features and objectives of the invention will become more readily apparent from the following detailed description taken in conjunction with the accompanying drawings in which.

Figure 1:
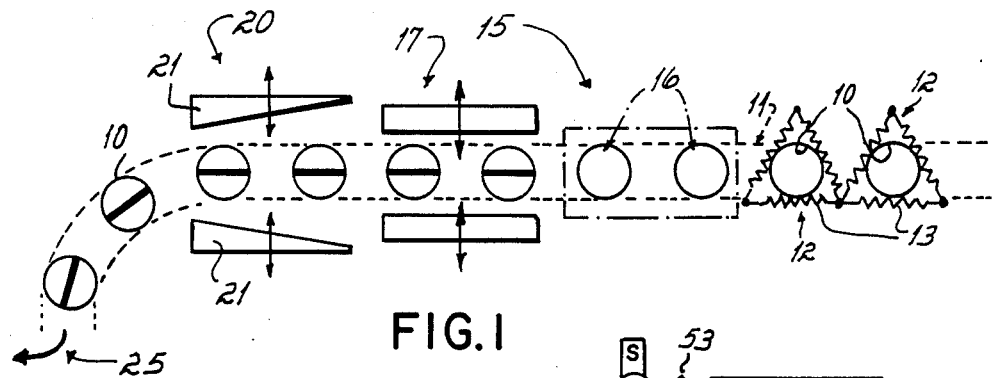
FIG. 1 is a diagrammatic plan view of the sealing apparatus.

The invention will be described in connection with an intermittent motion sealing apparatus, although it is contemplated that with modifications within the skill of the art the invention would be applicable to a continuous motion apparatus. Referring to FIG. 1, tubes 10 are conveyed on a conveyor 11. Each tube is supported within a spring-loaded tube holder 12 diagrammatically illustrated as three springs 13. Thus, the springs apply a slight friction to hold the tube erect and to assist its removal from the mandrel. At a heating station 15, two mandrels 16 are mounted for simultaneous raising and lowering to heat two tubes at a time.

Immediately adjacent the mandrels 16 are a pair of cooled jaws 17 mounted on a mechanism for bringing the jaws together against the tube walls, thereby forming a seal.

At trim station 20, reciprocating knives 21 are provided to trim excess material from the end of the tube above the sealed area. At station 25, the sealed tubes are removed and can be transferred to product buckets of a cartoner.

Figure 2:
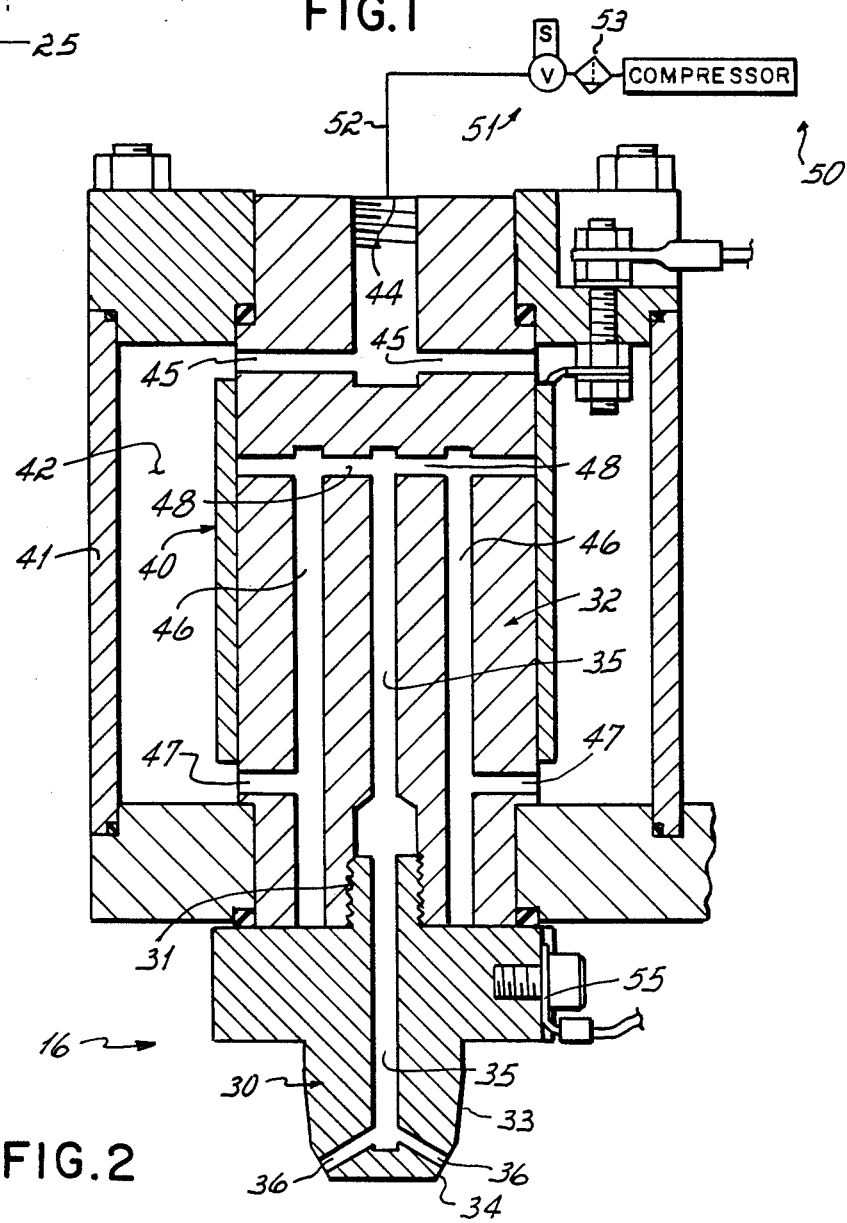
FIG. 2 is a cross-sectional view through the center of the mandrel assembly.

A mandrel assembly is shown in FIG. 2. A stud 30 is threaded at 31 onto a core 32 that is preferably made of aluminum or other high heat-conductive metal. The stud has a slightly tapered surface 33 the taper being approximately 5°. At the end of the stud, a severely tapered surface 34 provides a lead-in to the tube to be sealed. The taper of surface 34 may be about 30°. The tapered surfaces are preferably coated with a conventional Teflon-impregnated ceramic to provide a high release surface. The stud 30 and core 32 have a coaxial central longitudinal bore 35. Four equiangularly-spaced branch bores 36, connected to longitudinal bore 35, are formed in the end of the stud and exit at the surface of the lead-in taper. The function of the bores 35 and 36 is to direct pulses of hot air into the top of the tube to pressurize the head space above the product. In so doing, each pulse expands the tube at the area of engagement by the mandrel so that the mandrel can be raised away from the tube and the tubes indexed over to the closing jaws 17.

A 500 watt band heater 40 is mounted on the core 32 in intimate contact therewith. A heater cylinder 41 surrounds the core and is spaced therefrom to create a plenum 42. The core has an inlet port 44 at the end remote from the stud 30. A plurality of radial passageways 45 connect the port to the plenum chamber 42. The core has a plurality of longitudinal passageways 46 parallel to the central bore 35. Radial bores 47 connect the passageways 46 to the plenum 42. A plurality of radial passageways 48 connect the passageways 46 with the central bore or passageway 35. Thus, the air from the inlet port 44 to the discharge bores follows a tortuous path consisting of radial bores 45, plenum 42, radial bores 47, longitudinal passageways 46, radial passageways 48 and central bore 35. In making this transit through the passageways, the air is heated to about 400° F. and is thus substantially at the temperature of the interior surface of the tube after it has been heated. A compressor 50 provides air under a pressure of about 40 psi. An air filter 53 between compressor and solenoid valve removes all dust and oil particles. A solenoid-operated valve 51 in a line 52 between the compressor and a port 44 chops the air into a pulse that is emitted from the passage 36 as soon as the tube's surface is heated to its melting point. The peak pressure of the pulse is about 40 psi.

A thermocouple 55 is mounted on the stud 30 and is connected to the heater band 40 so as to maintain the temperature of the stud at a preset level of about 100° C. above the melting temperature of the plastic. That temperature can be varied, although it is contemplated that the temperature of the stud that contacts the tube as well as the temperature of the air pulsed into the tube should be about 100° C. greater than the melting point of the plastic of the tube.

Figure 3:
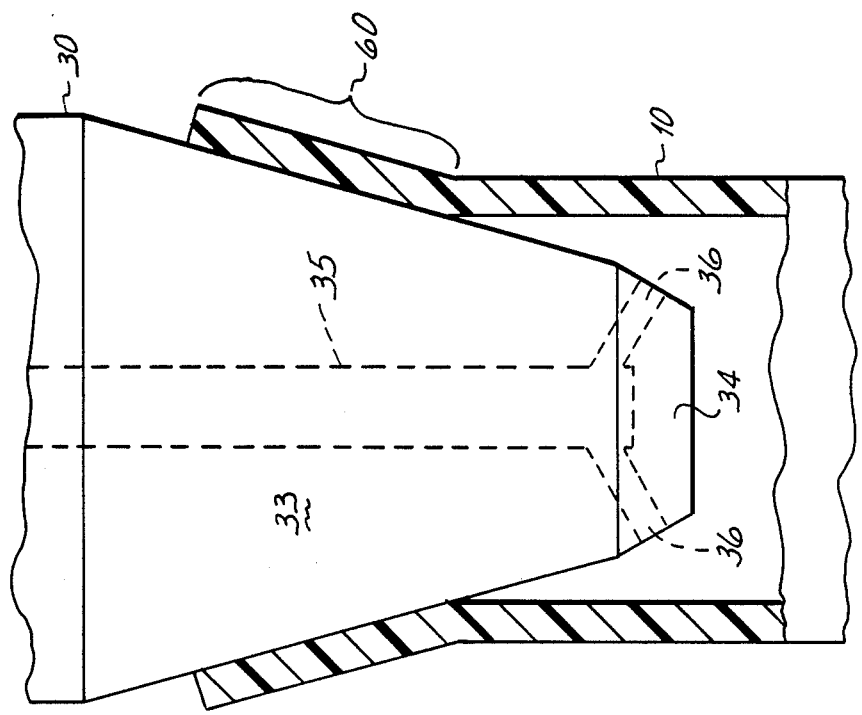
FIG. 3 is a diagrammatic view of a tube in engagement with the mandrel.

FIG. 3 illustrates diagrammatically the configuration of the end of the tube when the mandrel and specifically the tapered surface 33 of the stud 30 is inserted into the tube with the angle of taper being exaggerated slightly for illustrative purposes. A band indicated at 60 that is preferably no less than about one-fourth inch in width directly contacts the surface of the stud.

Figure 4:
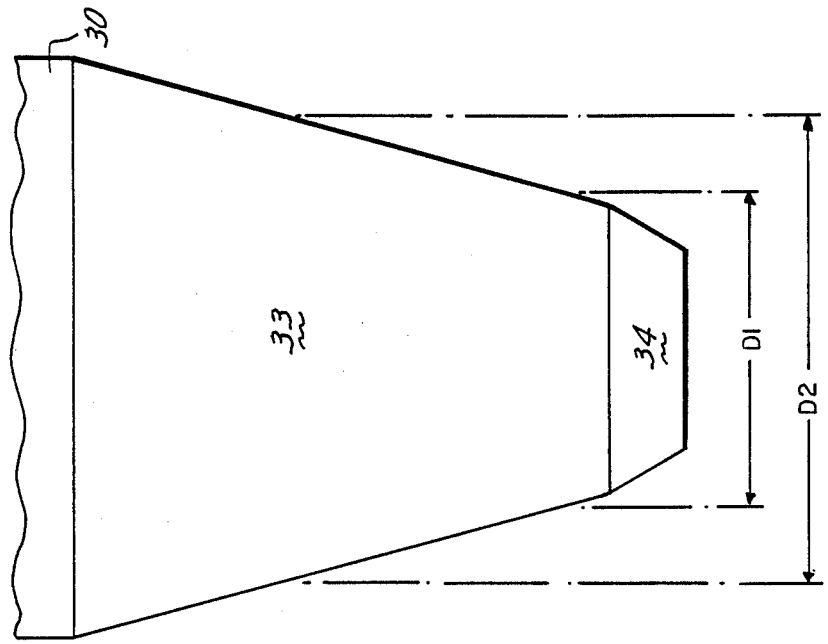
FIG. 4 is a diagrammatic view illustrating the range of tube diameters that can be sealed by one mandrel.

FIG. 4 is provided to illustrate that a tube having an inside diameter in the range of D1 to D2 can be accommodated by the same stud. The difference between the D1 and D2 will be about 0.020 inch and any tube in that range can have a band width of at least one-fourth inch heated to melting.

In the operation of the invention, tubes are filled in the apparatus of FIG. 1 and indexed into position below two mandrels. When the filled tubes arrive at the mandrels, the two hot mandrels are lowered into the respective tubes. The heat is applied over a period of about 180° of the cycle, it being contemplated that the apparatus will operate at about 100 cycles per minute. Thus, the contact time is about three-tenths of a second. As soon as the heating is completed, a pulse of air having a duration of about one-tenth of a second or approximately one-sixth of a cycle is introduced through the bores 36 while simultaneously the mandrels are raised. The springs in which the tubes are clasped helps to retain the tube while the mandrels are raised. Immediately after heating, the tubes are indexed to the station 17 where the water-cooled jaws close on the tubes to complete the sealing. The jaws are preferably cooled so that the molten plastic solidifies as soon as the fused joint is formed.

The tubes are then indexed to the trim station where the excess tube above the seal is trimmed off.

It is to be understood that in the carrying out of the process of the invention, heating and stretching of the end of the tube occurs only by contact with the tapered mandrel. While the description contemplates air primarily on retraction of the mandrel after heating, it is to be understood that air can be employed upon insertion of the mandrel in order to reduce the friction during the insertion.

It should be further understood that instead of a pulse of air on retraction, the tube could be grasped by mechanical means to overcome the friction of the withdrawal of the mandrel.

While the invention has been described in connection with a circular tube and mandrel, it should be understood that other geometric configurations can also be sealed.

While it is contemplated that air would normally be used for the separation from the heated stud, an inert gas can be used where the contents of the tube must be protected from exposure to air.

From the above disclosure of the general principles of the present invention and the preceding detailed description of a preferred embodiment, those skilled in the art will readily comprehend the various modifications to which the present invention is susceptible. Therefore, I desire to be limited only by the scope of the following claims and equivalents thereof:

I claim:

1. The method of sealing the open end of a tube with a heated mandrel having a hot tapered end, the method comprising the steps of, inserting the tapered end of said heated mandrel into the open end of said tube until the end of said tube is stretched radially outwardly, the end of said tube being flared by about 5° with respect to the longitudinal axis of the tube, maintaining said tube end in contact with said heated mandrel until a band of a minimum width of about one-fourth inch of the inside surface of said tube end is raised to a fusion temperature, withdrawing said heated mandrel from said tube, compressing the end of said tube to form a seal.

2. A mandrel for heating the end of a tube so that it can be subsequently sealed by compressing it between sealing jaws comprising, a stud having a longitudinal axis, means connected to said stud for raising its temperature, said stud having a surface at its end that is severely tapered with respect to said axis and a surface adjacent to said severely tapered surface that is slightly tapered to about 520 with respect to said axis, said severely tapered end surface facilitating insertion into the end of a plastic tube, said sever taper being about 30° with respect to said axis, said slightly tapered surface being engageable by the end of a tube to heat a band of a width of a minimum of about one-fourth inch of the interior surface of the end of the tube.

* * * * *

UNITED STATES PATENT AND TRADEMARK OFFICE
CERTIFICATE OF CORRECTION

PATENT NO.   : 4,933,041

DATED        : June 12, 1990

INVENTOR(S)  : Martin M. Wildmoser

It is certified that error appears in the above-identified patent and that said Letters Patent is hereby corrected as shown below:

Column 4, line 56, "520" should be -- 5° -- .

Column 4, line 58, "sever" should be -- severe -- .

Signed and Sealed this

Twenty-sixth Day of November, 1991

Attest:

HARRY F. MANBECK, JR.

*Attesting Officer*  *Commissioner of Patents and Trademarks*